United States Patent [19]
York

[11] 3,960,361
[45] June 1, 1976

[54] SOLENOID VALVE
[75] Inventor: Ray A. York, Villa Park, Calif.
[73] Assignee: Bertea Corporation, Irvine, Calif.
[22] Filed: Mar. 14, 1975
[21] Appl. No.: 558,441

[52] U.S. Cl. ................................ 251/141; 251/84; 251/368; 137/625.65
[51] Int. Cl.² .................... F16K 11/02; F16K 31/06
[58] Field of Search .......... 251/129, 139, 141, 138, 251/84, 87, 368; 137/625.65

[56] References Cited
UNITED STATES PATENTS

| | | | |
|---|---|---|---|
| 2,303,066 | 11/1942 | Ray | 251/141 X |
| 2,321,853 | 6/1943 | Ray | 251/141 |
| 2,339,352 | 1/1944 | Ray | 251/141 X |
| 2,374,895 | 5/1945 | Ray | 251/141 |
| 2,548,239 | 4/1951 | Ray | 251/141 X |
| 3,422,850 | 1/1969 | Caldwell | 251/84 |

Primary Examiner—William R. Cline
Assistant Examiner—Robert J. Miller
Attorney, Agent, or Firm—Gordon L. Peterson

[57] ABSTRACT

A valve comprising a valve body having a chamber therein, a knife-edged valve seat in the chamber, and a knife edge in the chamber substantially circumscribing the valve seat. First and second passages are provided in the valve body leading to the chamber with the first passage terminating in a port substantially at the valve seat. A valve member is adapted to engage the valve seat in a first position to block flow through the port and electromagnetic means is energizable to move the valve member off of the valve seat. The valve is constructed and arranged so that the movement of the valve member off of the valve seat is carried out with mechanical advantage.

13 Claims, 6 Drawing Figures

U.S. Patent June 1, 1976 Sheet 1 of 2 3,960,361
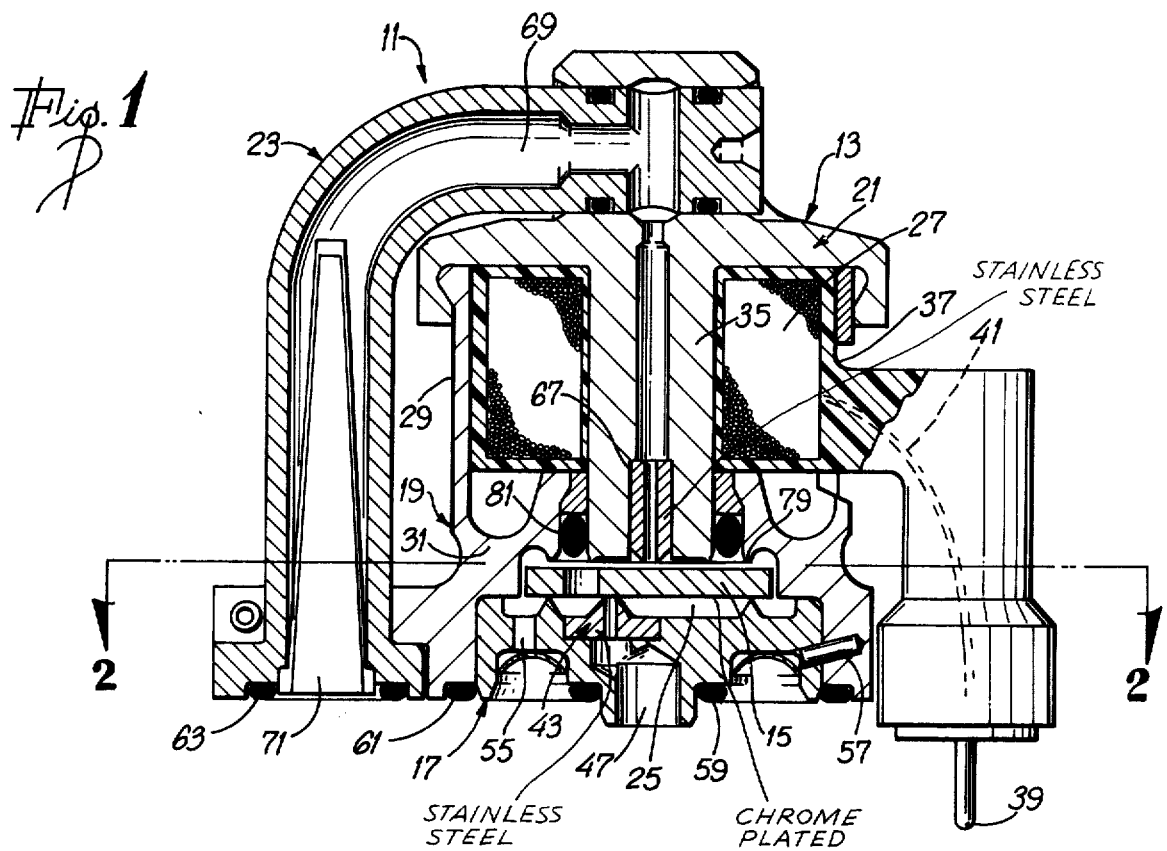
Fig. 1
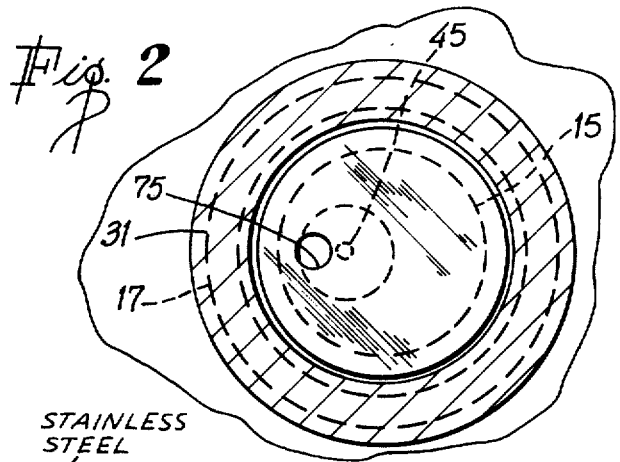
Fig. 2
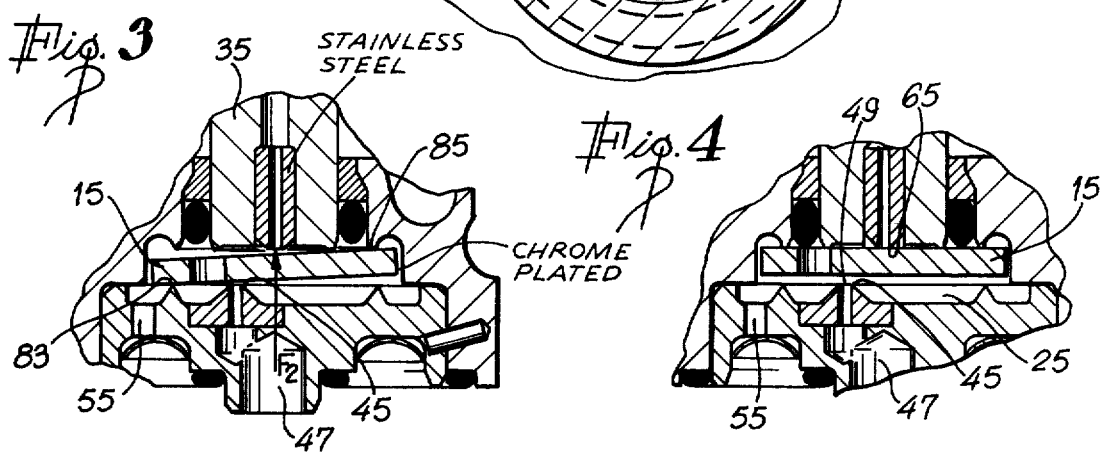
Fig. 3
Fig. 4

3,960,361

SOLENOID VALVE

BACKGROUND OF THE INVENTION

This invention relates to a valve in which the valve member which controls flow is electromagnetically operated. In a valve of this type the valve member, in addition to controlling flow, is also the armature for the solenoid or other electromagnetic means. Energization of the electromagnetic means results in movement of the valve member and a consequent opening or closing of a valve port. The valve member may be a free moving disc as shown, for example, in U.S. Pat. Nos. 1,302,511 and 3,498,330.

In one prior art valve of this type, a valve member is supported on three flat ended bosses. At least one of the bosses has a passage extending through it. When an electromagnet is energized, the valve member is raised off the bosses to provide a flow path through the passage in the boss.

One problem with this prior art valve is that it is difficult to seal against the flat end of the bosses particularly after a prolonged period of use. One reason is that contaminants inherently build up on the surfaces to prevent proper seating of the valve member on the bosses.

SUMMARY OF THE INVENTION

The present invention overcomes the sealing problem described above by employing a knife-edged valve seat for cooperation with the valve member. To protect the knife-edged valve seat, means surround the valve seat radially outwardly of the valve seat. Such means may include a wall which also terminates in a knife edge.

The knife edges of the valve seat and the wall inherently resist contaminant build up. To the extent that contaminants are deposited on the knife edges, the urging of the valve member against the knife edges causes the knife edges to cut through the deposited contaminants.

A valve constructed in accordance with the invention may include a valve body having a chamber therein and first and second passages in the valve body leading to the chamber. The valve member and valve seat are provided in the chamber and the first passage terminates in a first port substantially at the valve seat.

If the first passage leads to a region of lower fluid pressure than does the second passage, there will exist a pressure differential which tends to maintain the valve member in a first position, i.e. in engagement with the valve seat and blocking the first port. For some applications, it may be desirable to provide biasing means for urging the valve member toward the first position.

In order to move the valve member to open the first port, it is necessary to provide sufficient force to the valve member to overcome the differential fluid pressure. With the present invention, this force includes an electromagnetic force applied by electromagnetic means, and the valve member is pivoted out of the first position utilizing mechanical advantage. Accordingly, the magnitude of the electromagnetic force necessary to move the valve member is minimized. This in turn reduces the size, weight, and cost of the valve, all of which are of particular significance to the aircraft and space industry.

This can be advantageously accomplished by providing first and second fulcrums in the chamber. The resultant electromagnetic force is farther from the first fulcrum than the resultant fluid force tending to hold the valve member in the first position. Thus, mechanical advantage is obtained in a first stage pivoting movement which occurs about the first fulcrum.

At the end of the first stage pivoting movement, the valve member is in an intermediate position and the first port is open. In addition, the gap between the valve member and the electromagnetic means is reduced. Although the first stage pivoting movement is all that is required to open the first port, it is preferred to use the electromagnetic force to pivot the valve member about the second fulcrum toward a second position in a second stage pivoting movement. Because of the reduced gap between the electromagnetic means and the valve member, the second stage pivoting movement is easily carried out.

In order that the valve member can be operated electromagnetically, it is necessary that the valve member include magnetic material. However, in order to prevent wear on the surfaces of the valve member which contact the knife edges, these surfaces should be hard and wear resistant. This may be accomplished, for example, by constructing the valve member of magnetic material and plating the magnetic material with a nonmagnetic material. Similarly, to prevent erosion of the knife-edged valve seat, the valve seat can advantageously be formed of a relatively hard material. For example, an insert to the valve body may be provided with the insert being of hard material and having the valve seat thereon.

The valve body is constructed of a plurality of body sections, at least one of which is magnetic and at least another of which is nonmagnetic. This is desirable in order for the position of the valve member to be electromagnetically controlled.

The principles of this invention are applicable to both two-way and three-way valves as well as valves having other numbers of flow passages. For three-way valves, a second valve seat is provided in the chamber with the second passage terminating in a second port substantially at the second valve seat. The valve member closes the second port in the second position.

The invention can best be understood by reference to the following description taken in connection with the accompanying illustrative drawings.

BRIEF DESCRIPTION OF THE DRAWINGS

FIG. 1 is an elevational view partially in section showing one form of valve constructed in accordance with the teachings of this invention.

FIG. 2 is a fragmentary sectional view taken generally along line 2—2 of FIG. 1.

FIG. 3 is a fragmentary sectional view of the valve with the valve member at the end of the first stage pivoting movement.

FIG. 4 is a fragmentary sectional view similar to FIG. 3 with the valve member at the end of the second stage pivoting movement.

DESCRIPTION OF THE PREFERRED EMBODIMENTS

Figure 5:
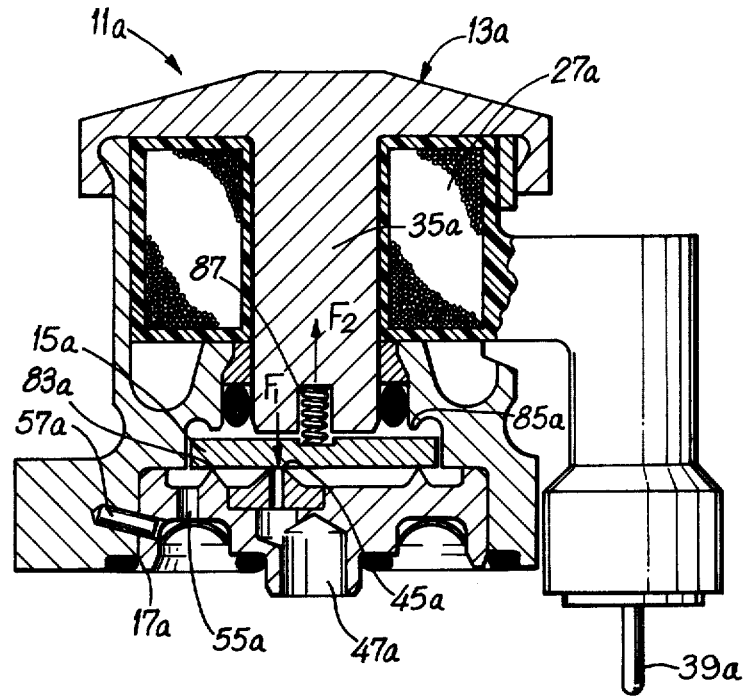
FIG. 5 is a view similar to FIG. 1 illustrating a two-way valve constructed in accordance with the teachings of this invention and illustrated in the closed position.

FIG. 1 shows a three-way solenoid valve 11 which generally includes a valve body 13 and a valve member 15. The valve body 13 includes body sections 17, 19, 21, and 23. The body sections 17, 19 and 21 cooperate to substantially define a chamber 25.

The body section 17 is constructed of a nonmagnetic material such as a suitable stainless steel. The body sections 19 and 21 are constructed of magnetic material such as a suitable steel and they cooperate to define a housing for a coil 27. Specifically, the body section 19 has a peripheral wall 29 which substantially circumscribes the coil and a lower wall 31 which encloses the lower end of the coil. The body section 21 has an end wall 33 which is appropriately coupled to the peripheral wall 29 and a core 35 extending axially through the coil.

The coil 27 is appropriately encased in a sheath 37 of plastic or other suitable material. Electrical power can be supplied to the coil 27 by way of terminals 39 and a lead 41.

An insert 43 is carried by the body section 17 in a recess configured to receive the insert 43. The insert 43 defines a knife-edged, circular valve seat 45 as shown more clearly in FIG. 1a. A passage 47 extends through the body section 17 and axially through the insert 43. The passage 47 terminates in a port 49 located substantially at the valve seat 45. The insert 43 is constructed of a relatively hard substantially nonmagnetic material such as stainless steel. The material of the insert 43 is harder than the material of the body section 17.

The body section 17 has an annular ridge or wall 51 (FIG. 1a) which terminates in a knife edge 53 and which circumscribes the valve seat 45 to protect the valve seat. The knife edge 53 and the knife edge of the valve seat 45 may all lie in the same plane, but preferably the knife edge of the valve seat 45 is slightly above the knife edge 53. The wall 51 protects the knife edge of the valve seat 45. The use of knife-edged valve seats and surrounding knife-edged protective means is known per se and such constructions are sold by Bertea Corporation of Irvine, California.

A second passage 55 is formed in the body section 17 and leads to the chamber 25. The body section 17 is received in a recess in the body section 19 and is suitably affixed thereto as by a pin 57 (only one being shown in FIGS. 1 and 1a). Annular seals 59, 61, and 63 are carried by the valve body 13.

Because the valve 11 is a three-way valve, a second valve seat 65 is provided in the chamber 25. In the embodiment illustrated, the valve seat 65 is defined by an insert 67 which is mounted in a counterbore in the core 35. The valve seat 65 is in the form of a circular knife edge. The insert 67 may be constructed of the same material as the insert 43, such material being harder than the material of the magnetic material of the core 35. A passage 69 extends from an outer port 71 of the body section 23 through the body section 23, the core 35, and the insert 67 and terminates in a port 73 substantially at the valve seat 65.

The valve member 15 in the embodiment illustrated is in the form of a circular disc having an aperture 75 extending through it. The aperture 75 provides communication between the port 73 and the portion of the lower surface of the valve member 15 circumscribed by the knife edge 53. The valve member 15 must include some magnetic material in order that its position can be controlled by the coil 27. Although various constructions are possible, in the embodiment illustrated, the valve member 15 is constructed of a suitable magnetic material, and it is plated with nonmagnetic material such as chrome to make the outer surfaces thereof much harder than they would be if the valve member were made entirely from magnetic material.

A pair of annular walls or ridges 77 and 79 circumscribe the valve seat 65. The ridge 77 has a relatively narrow edge in substantially the same plane as the valve seat and performs a protective function similar to the wall 51. The wall 51 and the ridge 77 need not completely circumscribe the valve seats 45 and 65, respectively; however, as the circumscribing extent of the wall 51 and the ridge is reduced some loss in protective ability occurs. Because the core 35 is constructed of softer material than the body section 17, the end of the ridge 77 is slightly wider than the knife edge 53.

The ridge 79 is axially recessed from the ridge 77 and helps retain a seal 81 which seals the interface between the core 35 and the body section 19. The body section 23 can be affixed to the body section 19 in any suitable manner.

In use, the passages 47, 55, and 69 are connected to fluid conduits (not shown) and the terminals 39 are coupled to an appropriate source of electrical energy. For example, the port 71 of the passage 69 may be coupled to a source of fluid under pressure and the passage 47 may be coupled to return. The passage 55 is in turn coupled to a conduit which will be maintained at supply or return pressure depending upon the position of the valve member 15. Thus, with the valve member 15 engaging the valve seat 45 as shown in FIG. 1, the passage 55 is maintained at supply pressure and with the valve member 15 engaging the valve seat 65 as shown in FIG. 4, the passage 55 is maintained at return pressure.

With the valve 11 coupled to an external fluid circuit as described above and with the valve member 15 in the position shown in FIG. 1, the upper surface (as viewed in FIG. 1) of the valve member is exposed to fluid at supply pressure. The lower surface of the valve member 15, except for the area circumscribed by the valve seat 45, is also exposed to fluid at supply pressure. The portion of the lower surface of the valve member 15 circumscribed by the valve seat 45 is exposed to fluid at return pressure, the latter being less than supply pressure. To the extent, if any, that the knife edge 53 isolates the valve member 15 from fluid at supply pressure, the effect is negligible because the area of contact between the knife edge 53 and the valve member is essentially zero.

With these pressures acting on the valve member 15, there is a differential fluid pressure acting on the valve member urging it against the valve seat 45. The resultant fluid force $F_1$ of this differential fluid pressure acts downwardly as viewed in FIG. 1a along the central axis of the valve seat 45.

Figure 1A:
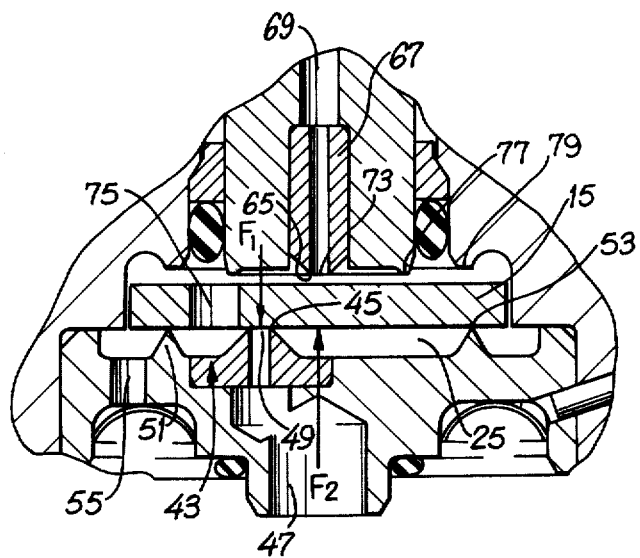
FIG. 1A is an enlarged view in section showing a portion of the valve shown in FIG. 1.

When the coil 27 is energized, the valve member 15 is pivoted in a first stage pivoting movement to an intermediate position as shown in FIG. 3 and then in a second stage pivoting movement to the position shown in FIG. 4. Energization of the coil 27 sets up an electromagnetic field the flux path for which includes the core 35, the valve member 15, the lower wall 31, the peripheral wall 29, and the end wall 33. This exerts an upward force on the valve member 15, the resultant $F_2$ of which acts upwardly as shown in FIG. 1a through the center line of the core 35.

The axes or center lines of the valve seat 45 and the core 35 are radially offset in the chamber 25 and so are the forces $F_1$ and $F_2$. Thus, the force vector $F_2$ tends to pivot the valve member 15 counterclockwise about a first fulcrum 83 as shown in FIG. 3. In the embodiment illustrated the first fulcrum 83 is defined by a portion of the knife edge 53. Because the distance between the fulcrum 83 and the force $F_2$ is greater than the distance between the fulcrum 83 and the force $F_1$, a mechanical advantage is obtained in the first stage pivoting movement. As the first stage pivoting movement continues, the gap between the valve member 15 and the core 35 reduces with a consequent increase in the electromagnetic force on the valve member 15.

The first stage pivoting movement continues until the valve member 15 strikes a portion of the ridge 79 which constitutes a second fulcrum 85 (FIG. 3). Thereafter, the valve member 15 pivots clockwise about the fulcrum 85 toward the position shown in FIG. 4. As the valve member 15 nears the valve seat 65, it strikes a region of the ridge 77, and the last increment of movement of the second stage pivoting movement occurs about a third fulcrum on the ridge 77. Alternatively, the ridge 79 may be axially recessed sufficiently so that the valve member 15 never engages it, in which event the second fulcrum is on the ridge 77, and all of the second stage pivoting movement occurs about the second fulcrum.

The second stage pivoting movement is facilitated by the increased electromagnetic force resulting from the reduction in the gap between the valve member 15 and the core 35 and by the reduction of the differential fluid pressure on the valve member 15. In the position shown in FIG. 4, the valve member 15 sealingly engages the valve seat 65 to block fluid at supply pressure from entering the chamber 25. In addition, a flow path between the passage 55 through the chamber 25 to the passage 47 is provided.

To return the valve member 15 to the position shown in FIG. 1, the coil 27 is deenergized. This permits the fluid under pressure from the passage 69 to force the valve member 15 downwardly against the valve seat 45.

The valve member 15 cooperates with the valve seats 45 and 65, the knife edge 53, and the ridge 77 to cut through any contaminants which may be deposited on these components. Accordingly, contaminants and particulate matter cannot cause a loss of sealing effectiveness in the valve 11. Because of the hardness of all of the knife edges and the valve member 15, wear on these parts is reduced.

FIG. 5 shows a valve 11a which is identical to the valve 11 in every way not shown or described herein. Portions of the valve 11a corresponding to portions of the valve 11 are designated by corresponding reference numerals followed by the letter a.

The basic functional difference between the valves 11 and 11a is that the latter is a two-way valve. Accordingly, the body section 23, the passage 69, the insert 67, and the ridges 77 and 79 have all been eliminated in the valve 11a.

The body section 17a is identical to the body section 17 except that the position of the pin 57a is reversed. The valve member 15a is identical to the valve member 15 except that the former has no aperture 75; however, because sealing occurs at the valve seat 45a, an aperture through the valve member may be provided if desired. A coil compression spring 87 acts between the core 35a and the valve member 15a to bias the valve member toward a closed position in which it sealingly engages the valve seat 45a.

In use of the valve 11a, the passage 55a may, for example, be coupled to a source of fluid under pressure and the passage 47a may be coupled to fluid under lesser pressure. In this event, there would be a resultant fluid force $F_1$ acting downwardly (as viewed in FIG. 5) through the center of the valve seat 45a as described above in connection with the valve 11. Similarly, when the coil 27a is energized, there exists a resultant electromagnetic force $F_2$ acting upwardly (as viewed in FIG. 5) along the center of the core 35a as described above with reference to the valve 11. Thus, the valve element 15a pivots in a two-stage pivoting operation about the fulcrums 83a and 85a, respectively, all as described in FIGS. 1–4. In the open position, the upper surface of the valve member 15a is flush with the lower face of the core 35a and the spring 87 is compressed. Accordingly, when the coil 27a is deenergized, the spring 87 urges the valve member 15a back to the closed position shown in FIG. 5.

Although exemplary embodiments of this invention have been shown and described, many changes, modifications and substitutions may be made by those with ordinary skill in the art without necessarily departing from the spirit and scope of this invention.

I claim:

1. A valve comprising:
    a valve body having a chamber therein;
    first and second passages in said valve body leading to said chamber;
    means defining a valve seat in said chamber, said first passage terminating in a first port substantially at said valve seat;
    first means in said chamber substantially circumscribing said valve seat for protecting the valve seat;
    a valve member having a first position in which it engages the valve seat to block flow through said first port, said valve member including magnetic material;
    said first and second passages being adapted to lead to regions of first and second fluid pressures, respectively, with said second pressure being greater than said first pressure whereby a resultant differential fluid force can act on said valve member and tend to maintain said valve member in said first position;
    electromagnetic means carried by said valve body and energizable to apply a resultant electromagnetic force to the valve member, said resultant electromagnetic force acting in a direction to move the valve member out of said first position;
    means defining a first fulcrum in said chamber;
    said valve member being pivotable on said first fulcrum out of said first position in a first stage pivoting movement whereby communication between said chamber and said passage through said first port is established;
    the resultant electromagnetic force being further from said first fulcrum than the resultant fluid force whereby said first stage pivoting movement is carried out with mechanical advantage; and
    said valve member having a surface engageable with said valve seat, said surface being of nonmagnetic material and being harder than the magnetic material of said valve member.

2. A valve as defined in claim 1 wherein said valve seat includes a knife edge engageable with the valve member in the said first position.

3. A valve as defined in claim 1 wherein said valve body includes a body section, said valve seat being carried by said body section and being constructed of substantially nonmagnetic material, said valve seat being constructed of harder material than said body section.

4. A valve as defined in claim 1 wherein said valve member moves to an intermediate position in said first stage pivoting movement and said valve includes means for defining a second fulcrum in said chamber, said resultant electromagnetic force being operative to pivot the valve member about the second fulcrum from said intermediate position toward a second position in a second stage pivoting movement.

5. A valve as defined in claim 4 including means defining a second valve seat in said chamber, said second passage terminating in a second port substantially at said second valve seat, and said valve member closing said second port in said second position.

6. A valve as defined in claim 1 including mechanical means for resiliently biasing said valve member toward said first position.

7. A valve comprising:
a valve body having a chamber therein;
first and second passages in said valve body leading to said chamber;
first means defining a knife edged valve seat in said chamber, said first passage terminating in a first port substantially at said valve seat;
means defining a wall in said chamber, said wall substantially circumscribing the valve seat;
a valve member having a first position in which it engages the valve seat to block flow through said first port, said valve member including magnetic material;
electromagnetic means carried by said valve body and energizable to apply a resultant electromagnetic force to the valve member, said resultant electromagnetic force acting in a direction to move the valve member away from said valve seat;
the central axis of said port being offset radially from said electromagnetic resultant force at said valve member; and
said valve body including a body section and said first means including an insert of nonmagnetic material, said insert being carried by said body section and having said valve seat thereon, said valve seat being of harder material than said body section.

8. A valve defined in claim 7 wherein said valve member has a surface engageable with said valve seat, said surface being of nonmagnetic material and being harder than the magnetic material of said valve member.

9. A valve as defined in claim 7 wherein said resultant electromagnetic force moves the valve member to a second position, said valve including means defining a second valve seat in said chamber, said second passage terminating in a second port substantially at said second valve seat, and said valve member closing said second port in said second position.

10. A valve as defined in claim 9 wherein said second valve seat has a knife edge and said valve includes means substantially circumscribing said second valve seat to protect said second valve seat.

11. A valve as defined in claim 7 wherein said valve body includes a plurality of body sections, a first of said body sections being of nonmagnetic material and having said wall thereon, at least a second of said body sections being of magnetic material and defining at least a portion of the flux path for said electromagnetic means.

12. A valve as defined in claim 1 wherein said first fulcrum is on said first means.

13. A valve comprising:
a valve body including a peripheral wall defining a cavity, a core of magnetic material extending through the cavity, and a first wall extending from the peripheral wall generally toward the core, said valve body having a chamber therein, said core terminating in said chamber;
first, second and third passages in said valve body leading to said chamber;
first means defining a first knife edged valve seat in said chamber, said first passage terminating in a first port substantially at said valve seat;
an insert in said core, said insert defining a second knife edged valve seat in said chamber, said second passage extending through said core and said insert;
means defining a second wall in said chamber, said second wall substantially circumscribing the first valve seat;
a valve member having a first position in which it engages the first valve seat to block flow through said first port, and a second position in which it engages the second valve seat to block flow between the second passage and the chamber, said valve member including magnetic material;
a seal between said core and said first wall to seal the cavity from the chamber;
a coil in said cavity and energizable to apply a resultant electromagnetic force to the valve member, said resultant electromagnetic force acting in a direction to move the valve member from said first position to said second position; and
the central axis of said port being offset radially from said electromagnetic resultant force at said valve member.

* * * * *